Oct. 4, 1938. R. K. WINNING Re. 20,879

PERMUTATION LOCK

Original Filed Sept. 22, 1930 2 Sheets-Sheet 1

Inventor

Robert K. Winning

By Wheeler, Wheeler & Wheeler

Attorneys

Oct. 4, 1938. R. K. WINNING Re. 20,879

PERMUTATION LOCK

Original Filed Sept. 22, 1930 2 Sheets-Sheet 2

Inventor

Robert K. Winning

By Wheeler, Wheeler & Wheeler

Attorneys

Reissued Oct. 4, 1938

Re. 20,879

UNITED STATES PATENT OFFICE 20,879

PERMUTATION LOCK

Robert K. Winning, Wauwatosa, Wis., assignor, by mesne assignments, to The Dudley Lock Corporation, Chicago, Ill., a corporation of Illinois Original No. 1,888,647, dated November 22, 1932, Serial No. 483,481, September 22, 1930. Application for reissue November 8, 1933, Serial No. 697,209

15 Claims. (Cl. 70—25)

This invention relates to improvements in permutation locks.

It is the primary object of the invention to provide a novel and improved and simple construction wherein pressure of the shackle may be used not only to push the bolt aside when the device is unlocked but may subsequently be used to re-engage the bolt when it is desired to cause the device to lock. It is also an object of the invention to provide means whereby the movement of the shackle serves to disarrange the permutation mechanism so that when the parts are placed in locked position the permutation members must be reset to release position before the lock can be opened.

I am aware that attempts have previously been made to produce an arrangement for utilizing pressure of the shackle to engage the bolt therewith in a lock of this general type. It is my present specific purpose to make a relatively simple device in which the parts will be rugged and their action certain to the end that difficulties heretofore encountered may be eliminated.

In the drawings.

Like parts are identified by the same reference characters throughout the several views.

The lock is of the general type illustrated in the United States Letters Patent No. 1,736,183 dated November 19, 1929, in which a lock case, 8, is provided internally with a mounting plate, 9, having an upturned ear, 10, for guiding shackle, 11. A central post is provided at 12 upon which permutation disks, 13 and 14, are guided, the disk, 15, being connected with the hub portion, 16, of a knob, 17, journaled in the cover, 18, of the case.

Figure 4:
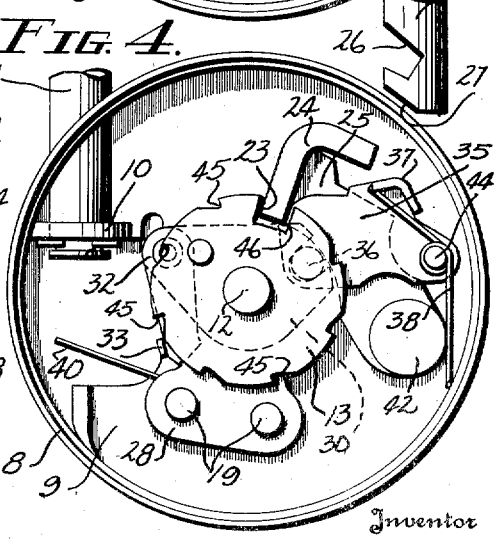
Figure 4 shows the final position of the parts as the shackle is withdrawn.
Figure 5:
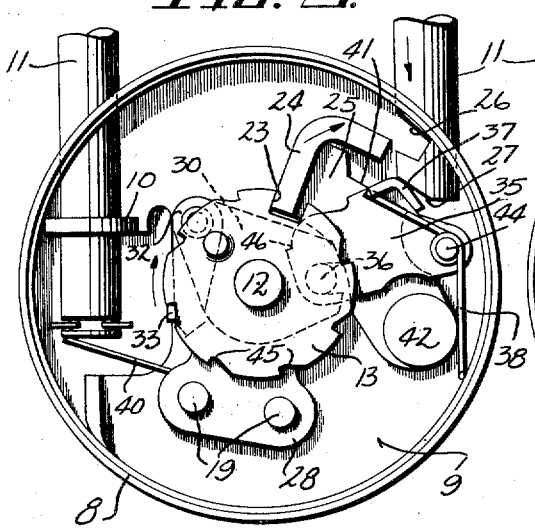
Figure 5 shows the parts as they appear during a subsequent downward movement of the shackle.

The mounting plate, 9, also carries posts, 19, for the spacer members, 20, which are formed as illustrated in Figure 5 of said patent and are interposed between successive disks of the permutation device. The final disk, 13, of the series is shown in Figures 2 to 7 inclusive and is provided at 23 with a notch into which the flange keeper portion, 24, of the oscillatory bolt, 25, is receivable when said notch is aligned with the corresponding notches of the other disks and in registry with flange, 24.

The free arm of the shackle, 11, is also notched at 26, its faces at opposite sides of the notch being inclined from its inside surface toward its end. The end of the free arm of the shackle, 11, is correspondingly beveled at 27. The structure thus far described is illustrated in the above identified patent. I shall now refer to features which have been added for the purpose of the present invention.

Figure 1:
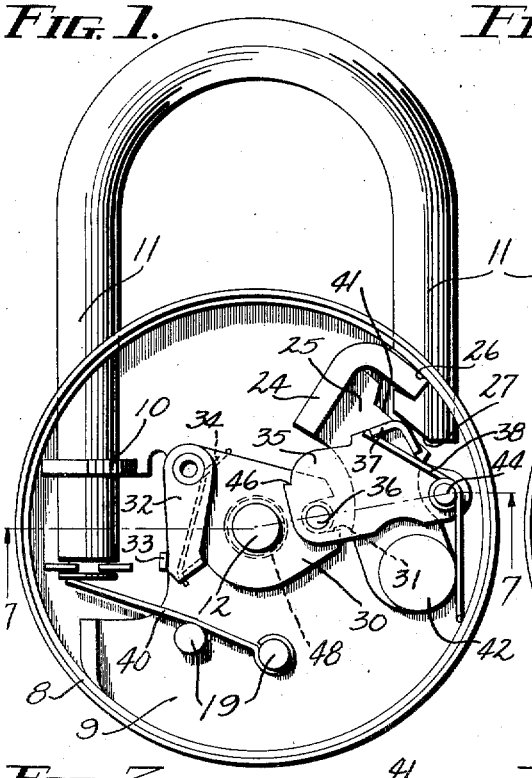
Figure 1 is a front elevation of a lock case from which the permutation mechanism has been removed to expose in the bottom of the case the particular parts having principally to do with the present invention.

Beneath disk, 13, and separated therefrom by a special spacer, 28, is a pawl carrying lever, 30, of the peculiar form clearly shown in Figure 1. At one end it is provided with an open bearing, 31, while at the other it carries pivotally a pawl, 32, of which the free or active end carries a lug, 33, and torsion spring, 34, tends to throw the free end of the pawl toward the post, 12, upon which lever, 30, is fulcrumed.

Figure 7:
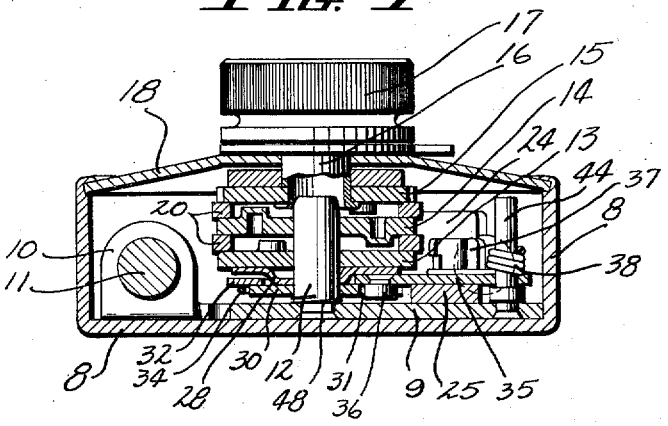
Figure 7 is a view of the complete lock in transverse cross section on the line shown at 7—7 in Figure 1.

Overlying the bolt, 25, and the bearing end of the pawl carrying lever, 30, is an actuating lever, 35, carrying a pin, 36, engaged in the open bearing, 31, of lever, 30. Lever, 35, has an upturned flange at 37 notched to serve as anchorage for the torsion spring, 38, as best shown in Figure 7 and adapted also to provide a bearing surface for the beveled end, 27, of the shackle.

Figure 2:
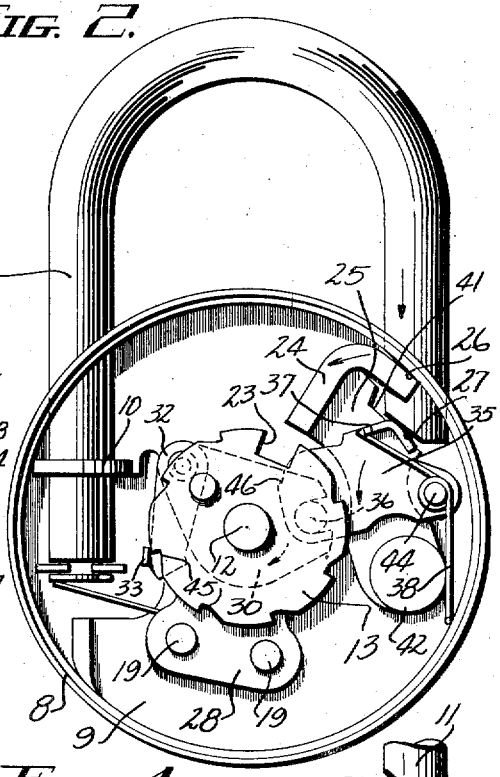
Figure 2 is a view showing the same parts with the locking disk of the permutation mechanism superimposed thereon.

With the parts shown in Figure 1, the permutation disks are manipulated until their respective notches register with the keeper flange, 24, of bolt, 25, as illustrated by the position of disk, 13, in Figure 2. The permutation mechanism now being in a position to permit the opening of the lock, the operator will press on the bight of the shackle to move the shackle against the spring, 40, toward the position illustrated in Figure 3. The beveled surface, 27, of the shackle will ride upon the inclined margin, 41, of the bolt, 25, to oscillate the bolt counterclockwise about its fulcrum pin, 42. This motion is permitted by entry of the flange, 24, into notch, 23. At the same time the beveled surface, 27, of the shackle engages flange, 37, of the actuating lever, 35, to oscillate this lever also in a counterclockwise direction about its fulcrum pin, 44.

The counterclockwise oscillation of lever, 35, produces clockwise oscillation of lever, 30. While the movement of these parts performs no function at this particular time due to the fact that the pawl lug, 33, is not engaged in any of the peripheral notches, 45, of disk, 13, the movement has been described for the reason that it is necessary in this device to provide for such movement and to make provision also for guarding against displacement of disk, 13, as the result of such movement.

Figure 3:
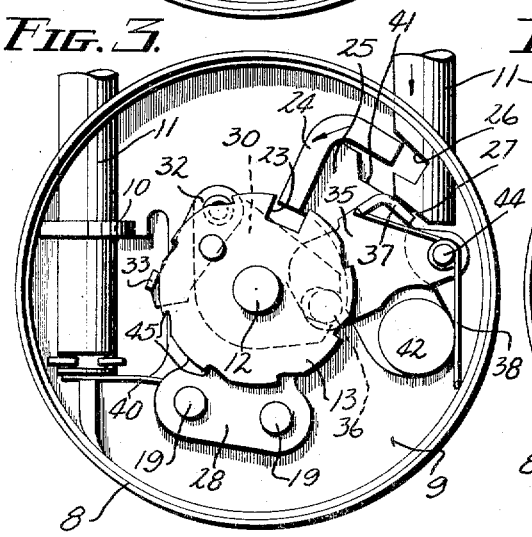
Figure 3 shows the parts as they appear when the shackle is pressed to open the lock.

With the parts in the position illustrated in Figure 3, the shackle may now be withdrawn. The distorted spring, 40, will assist in its initial outward movement toward the position in which the shackle is illustrated in Figure 4. In the course of such outward movement the end portion of the shackle beyond notch, 26, will engage the inclined end face of the keeper flange, 24, to force the keeper flange to its ultimate position in the notch, 23, of permutation disk, 13. The withdrawal of the shackle allows spring, 38, to force lever, 35, in a clockwise direction as viewed in Figure 4 beyond the original position in which such lever was held by the shackle in the Figure 2 disposition of the parts. Obviously the movement of lever, 35, is transmitted through pin, 36, to lever, 30, and as a result of the new extreme position of lever, 30, the lug, 33, of the ratchet dog, 32, passes about the periphery of permutation disk, 13, to a point where it will be sure of engagement with one of the notches, 45, during its return movement.

The ultimate position of the levers is defined by the engagement of notched portion, 46, of lever, 35, with the keeper flange, 24. It is particularly to be noted that in this position of the parts as shown in Figure 4, the lever, 35, acts as a compression member to restrain keeper, 24, from any movement out of engagement with notch, 23, of the permutation disk. This action by the lever 35 is occasioned due to the eccentric location of the pivot 44 with reference to the axis of rotation of the bolt member 25 which sets up a binding action between the bolt and the notch 46 carried by the lever 35 operating to prevent rotation in a clockwise direction beyond that indicated by the position of parts as shown in Fig. 4. The important result of this interaction of the parts is to prevent any displacement either of the keeper or the disk while the shackle is withdrawn. There is sufficient lost motion between the position of lug, 33, in Figure 4 and the shoulder of the nearest adjacent notch, 45, so that the portion, 46, of lever, 35, which performs the obstructing function just described will move out of the way as shown in Figure 5 before lug, 33, is fully engaged with notch, 45, and the rotation of disk, 13, is commenced.

When it is desired to lock the shackle, it is subjected to pressure tending to force its shorter end into the lock casing, which it enters as shown in Figure 5. Its initial engagement with the bearing flange, 37, of lever, 35, will cause a counterclockwise movement of lever, 35, and a corresponding clockwise movement of lever, 30, which will have the effect of engaging lug, 33, snugly in the adjacent notch, 45, and removing portion, 46, of lever, 35, from the path of the keeper as aforesaid.

Figure 6:
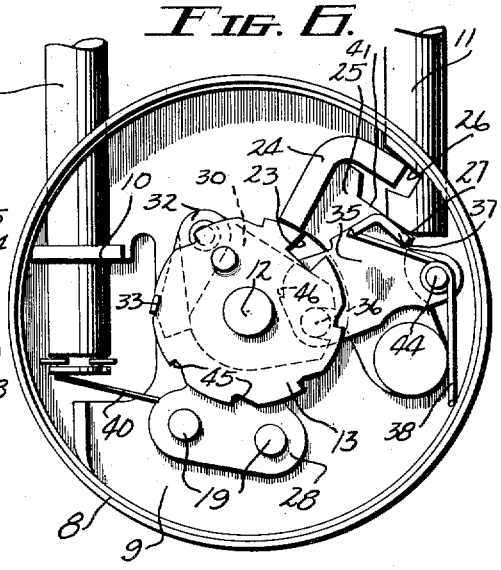
Figure 6 shows the parts in the position which they occupy as the shackle reaches its downwardmost position.

The succeeding movement of the shackle, 11, under continued pressure exerted by the operator will cause a continued movement of levers, 35 and 30, in the respective directions just described, and the engagement of lug, 33, with permutation disk, 13, will produce clockwise rotation of such disk to the position in which it is illustrated in Figure 6. It will be noted that the direction of thrust of the left-hand edge of the notch, 23, of said disk upon the keeper flange, 24, will be such as to tend to oscillate the keeper flange and its associated bolt lever, 25, in a clockwise direction about the fulcrum, 42, whereby to re-engage the bolt in notch, 26, of the shackle.

The movement described will continue until the notch, 23, in permutation disk, 13, has passed entirely out of registry with keeper flange, 24, as shown in Figure 6. In this position of the parts, spring, 40, engaging the longer end of the shackle will be somewhat distorted and consequently upon release of the shackle by the operator, the spring, 40, will force the shackle back to the position in which it is illustrated in Figures 1 and 2, thereby engaging the keeper flange, 24, to its full depth in notch, 26, and allowing levers, 35 and 30, to return to a position in which the lug, 33, is disengaged from permutation disk, 13.

It is particularly to be noted that the normal locked position of the parts is such that the levers, 35 and 30, are both intermediate the ends of their paths of movement. It is this fact, taken with the multiplication of movement afforded by the use of the levers, 35, and 30, which ensures the accurate and positive interaction of the parts. It is not until the shackle is unlocked and partially withdrawn from the lock casing that lug, 33, engages permutation disk, 13, and the relatively large angular rotation of such disk produced by a relatively short movement of the shackle after it re-enters the casing positively moves the disk out of registry with the keeper.

Another important means of securing accuracy is the use of a pawl carrying lever, 30, which is fulcrumed directly on post, 12, and the pawl, of which is engaged directly with the periphery of disk, 13.

To prevent the permutation disk from undesired rotative displacement and particularly to protect disk, 13, from displacement such as might otherwise be occasioned by the frictional engagement of lug, 33, with its periphery, I prefer to employ a small compression spring at 48 on post, 12, which maintains intimate contact between the permutation disks and the several spacers, 20 and 28. The resulting action is equivalent to that of a friction clutch tending to hold each disk stationary until it is positively displaced.

I claim:

1. A permutation lock provided with means for utilizing the entering movement of its shackle for engaging a keeper therewith, said means comprising the combination with a permutation disk provided with means for interacting with a keeper, of a pair of levers in motion transmitting connection, one of said levers being pivoted coaxially with said disk and provided with means engageable with said disk for the rotation thereof and normally disengaged therefrom, the other of said levers being positioned for operation by a portion of said shackle.

2. In a permutation lock, the combination with a notched shackle, a notched permutation disk, and a keeper alternatively engageable therewith, of a stop member movable to a position of engagement with the keeper when the latter is engaged in the notch of said disk and adapted in said position to restrain said keeper from disengagement, a spring pressing said stop member toward said position, and means on said stop member with which said shackle is normally engageable when locked to maintain said stop member in a retracted position such as to permit free movement of said keeper.

3. In a permutation lock, the combination with a notched shackle, a notched permutation disk, and a keeper alternatively engageable therewith, of a stop member movable to a position of engagement with the keeper when the latter is engaged in the notch of said disk and adapted in said position to restrain said keeper from disengagement, a spring pressing said stop member toward said position, and means on said stop member with which said shackle is normally engageable when locked to maintain said stop member in a retracted position such as to permit free movement of said keeper, together with lost motion connections from said stop member to said disk for the rotation of said disk in a direction to disengage the keeper therefrom following the movement of said stop member to its retracted position.

4. In a permutation lock, the combination with rotatable means provided with peripheral notches, of a bolt member having a keeper portion movable into cooperative engagement with a notch of said means, and connections for the rotation of said means in a direction to cause the wall of said notch to act cam-wise on the keeper portion and disengage it from said notch, said connections comprising a dog carrying lever having a dog engageable with said means, and a second lever in pivotal connection with said dog carrying lever, each of said levers having its motion receiving portion closer to its fulcrum than its motion delivering portion whereby to multiply the motion transmitted to said means.

5. In a permutation lock the combination with notched rotatable means and a keeper having a portion engageable in a notch of said means, of connections for the rotation of said means in a direction to cause a wall of said notch to act cam-wise on said keeper portion for shifting it out of said notch, said connections comprising a pawl carrier fulcrumed co-axially with said means and a pawl engageable with said means, a lever in pivotal connection with said pawl carrier at a radius less than that of said means, and a shackle with which said keeper is engageable upon its disengagement from said means, said shackle being movable in a path whereby it is engageable with said lever closely adjacent its fulcrum for oscillation of said lever in a direction to rotate said means through said carrier and pawl.

6. In a permutation lock, the combination with a shackle, a keeper, and a permutation disk having its periphery provided with a plurality of notches, of motion transmitting connections acting directly upon said notched periphery of the disk for rotating it in a direction to disengage the keeper therefrom, and including a member disposed in the path of movement of a portion of the shackle to receive motion from it.

7. In a permutation lock, the combination with a notched shackle, a permutation disk having its periphery provided with a plurality of notches, and a keeper alternatively engageable with a notch of the permutation disk or shackle; of a ratchet pawl positioned to interact directly with the notches of the disk, and motion-multiplying connections for the actuation of said pawl, including a part disposed in the path of movement of a portion of the shackle.

8. In a permutation lock, the combination with a locking element, a keeper co-operatively engaged therewith, of means for utilizing the movement of said locking element for locking the lock, said means comprising a permutation disk in the lock for controlling the movement of the keeper and having its periphery provided with a plurality of notches, a ratchet pawl engageable with said notched periphery of the disk, and motion-multiplying connections operatively connected with the ratchet pawl and including a member disposed in the path of movement of a portion of said locking element, whereby actuation of said connections causes said ratchet pawl to rotate said disk and thereby shift the keeper into operative engagement with the locking element.

9. In a permutation shackle lock, a shackle locking mechanism comprising a keeper, permutation disk tumblers, means for effecting adjustment of said tumblers to release the keeper, said keeper when so released being displaceable from shackle-retaining position in response to movement of the shackle when the mechanism is in a release condition, said adjustment of said tumblers being maintained by the keeper when so displaced, and means releasably holding the keeper so displaced, but allowing a positive operation thereof to move said keeper into shackle-retaining position, such operation being effected by inserting the shackle.

10. In a permutation shackle lock, a shackle locking mechanism comprising a swinging keeper operable to move into shackle-retaining position by insertion of the shackle, and displaceable from said position by movement of the shackle when the mechanism is in a release condition, permutation-controlled means including disk tumblers cooperable with said keeper to lock the same in shackle-retaining position, and adjustable to establish said release condition, said keeper having a cooperating part and said tumblers having slots receiving the same when the keeper is in displaced position, detent means for releasably maintaining the keeper and tumblers in such adjusted position when the shackle is withdrawn, and means for automatically operating a portion of said permutation-controlled means to establish the locked condition of the mechanism when the keeper is moved into shackle-retaining position.

11. In a permutation shackle lock, a shackle locking mechanism comprising a keeper, permutation disk tumblers, means for effecting adjustment of said tumblers to release the keeper, said keeper when so released being displaceable from shackle-retaining position in response to movement of the shackle when the mechanism is in a release condition, said adjustment of said tumblers being maintained by the keeper when so displaced, and means movable into direct operable engagement with the periphery of one of said disk tumblers in response to unlocking movement of the shackle, said means being actuated in response to the locking movement of the shackle for positively disarranging said disk tumblers.

12. In a permutation lock, the combination with a notched tumbler, a bolt receivable in the notch and a shackle engageable by said bolt and releasable therefrom when said bolt is received in said notch, of means operated in accordance with the movement of said shackle adapted for interlocking engagement with said bolt and adapted to restrain said bolt in its unlocked position when said shackle is displaced from the position for engagement with said bolt.

13. In a permutation lock, the combination with a tumbler provided with a bolt receiving notch and a bolt engageable in said notch, of a shackle adapted to be locked by said bolt and to be released therefrom when said bolt is engaged in said tumbler notch, of means positioned to derive motion from said shackle for the mechanical actuation of said tumbler to a bolt excluding position, said means including a part adapted in the opening movement of said shackle to interlockingly engage said bolt to restrain said bolt in its unlocked position.

14. In a permutation lock, the combination with a tumbler provided with a bolt receiving notch and a bolt engageable in said notch, of a shackle adapted to be locked by said bolt and to be released therefrom when said bolt is engaged in said tumbler notch, of means positioned to derive motion from said shackle for the mechanical actuation of said tumbler to a bolt excluding position, and means adapted in the opening movement of said shackle to interlockingly engage said bolt to restrain said bolt in its unlocked position.

15. In a permutation lock, a locking member, a plurality of tumbler disks having alignable bolt receiving notches, a bolt normally blocking unlocking movement of said member except when the notches of the tumblers are adjusted to register with the bolt for permitting such movement; externally adjustable means including a movable indicator and a cooperating fixed index, said means being connected to the tumbler disks for adjusting them in registered relation; means for engaging at least one of the tumbler disks and movable for shifting it out of adjusted position, and means through which the movement of the locking member results in such movement of the engaging means.

ROBERT K. WINNING.